July 17, 1956 B. H. NICOLAISEN 2,755,307
PROCESS FOR THE RECOVERY OF 2,4,5-TRICHLOROPHENOL
Filed May 7, 1953
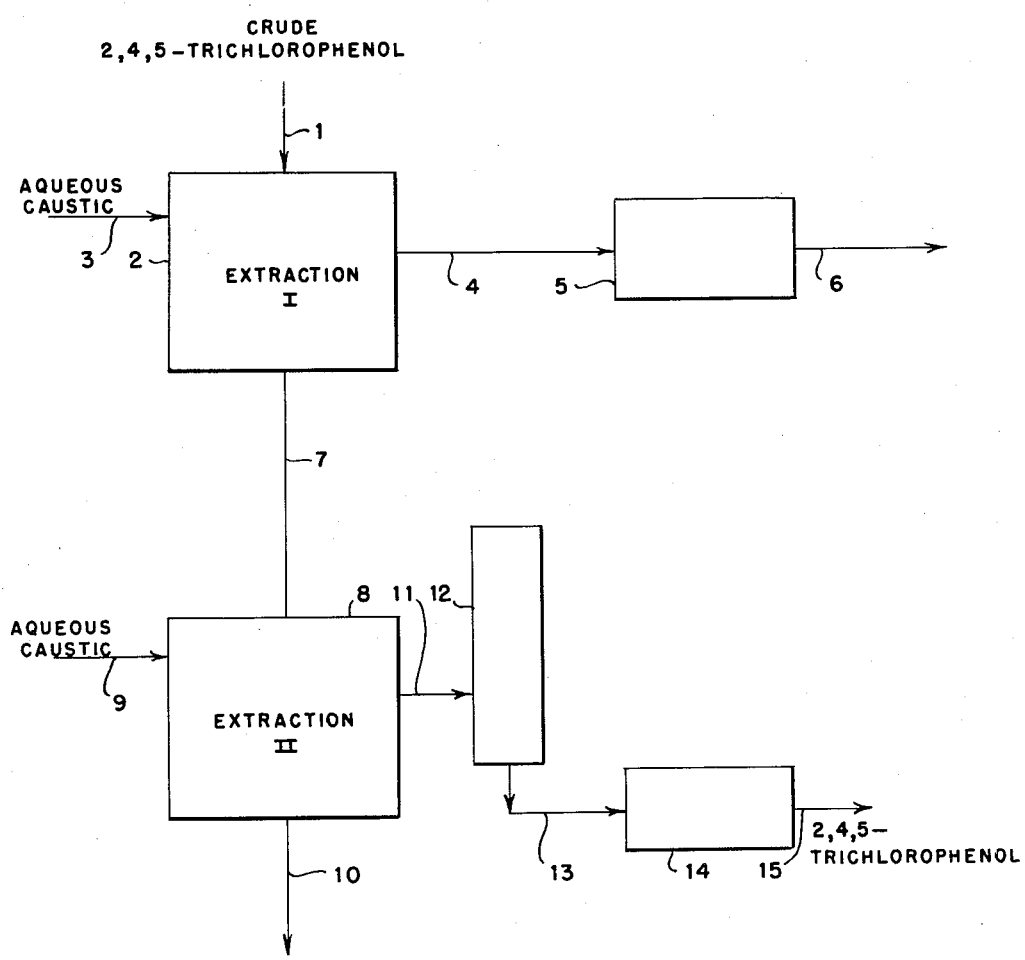
INVENTOR.
Bernard H. Nicolaisen
BY
ATTORNEYS

2,755,307

PROCESS FOR THE RECOVERY OF 2,4,5-TRICHLOROPHENOL

Bernard H. Nicolaisen, Kenmore, N. Y., assignor to Olin Mathieson Chemical Corporation, a corporation of Virginia Application May 7, 1953, Serial No. 353,659

1 Claim. (Cl. 260—623)

My invention relates to the production of 2,4,5-trichlorophenol by caustic hydrolysis of 1,2,4,5-tetrachlorobenzene and in particular relates to the purification of the crude 2,4,5-trichlorophenol product so derived.

In the caustic hydrolysis of 1,2,4,5-tetrachlorobenzene numerous contaminating products are formed. Methanol, for example, which may be used as a solvent for the hydrolysis reaction, tends to cause some production of trichloroanisole and dichlorodimethoxybenzene. The presence of the usual small amounts of other tetrachlorobenzene isomers, such as 1,2,3,4-tetrachlorobenzene, as impurities in the symmetrical 1,2,4,5-tetrachlorobenzene, causes the production of undesired position isomers of 2,4,5-trichlorophenol.

At the present time there exists a substantial demand for a high purity 2,4,5-trichlorophenol product which is not satisfied by the crude derived by the caustic hydrolysis of 1,2,4,5-tetrachlorobenzene. The demand is, in particular, for a product having a melting point over 65° C. which in the molten state has a water-white color. The product must also be completely soluble in caustic solution, e. g. 0.1 N NaOH, and should be at least 99% pure.

Caustic-insoluble materials, such as trichloroanisole and dichlorodimethoxybenzene, may be removed to some extent by steam distillation of the alkaline phenate solution but complete removal of these impurities requires excessive amounts of steam. Other impurities, such as the position isomers of 2,4,5-trichlorophenol are more difficult to separate because of their similar chemical and physical properties.

A high purity 2,4,5-trichlorophenol product meeting the above specifications can be recovered from the crude trichlorophenol obtained by caustic hydrolysis of 1,2,4,5-tetrachlorobenzene. I have found, in particular, that crude 2,4,5-trichlorophenol resulting from the acidification of the alkaline hydrolysis mixture can be separated into pure 2,4,5-trichlorophenol free from undesirable contaminants by a step-wise extraction with aqueous caustic.

The process of my invention thus essentially requires extracting crude 2,4,5-trichlorophenol with aqueous caustic solution sufficient in amount to convert all of the 2,3,6-trichlorophenol and other extraneous phenols present and a minor proportion of the 2,4,5-trichlorophenol to the water-soluble corresponding phenates. The operation is carried out at a temperature at which the phenols are in the liquid state. Unneutralized phenols are then separated from the dilute aqueous phenate solution.

The unneutralized phenols, separated from the aqueous phenate phase, are further extracted by the addition of aqueous caustic solution in an amount sufficient to convert substantially less than the total of the phenols present to the corresponding phenates. The extraction is again carried out at a temperature at which the phenols are in the liquid state. The aqueous phenate extract solution is then separated from the remaining undissolved oils. Acidification of this second extract yields the desired purified 2,4,5-trichlorophenol product which is separated and dried.

The remaining undissolved oils comprise trichlorophenols contaminated with alkali-insoluble impurities and are useful as crude trichlorophenol for most purposes not requiring the pure isomer. The phenate solution obtained in the first extraction step, although relatively impure, is also suitable for use after acidification as crude trichlorophenol. Alternatively, both fractions may be worked up for specific trichlorophenols or phenol ethers contained therein or they may be discarded.

My invention will be further illustrated by reference to the accompanying drawing which is a diagrammatic flow plan of the process.

Crude 2,4,5-trichlorophenol, obtained by caustic hydrolysis of 1,2,4,5-tetrachlorobenzene followed by acidification, is introduced by line 1 to a first extraction step 2. The crude 2,4,5-trichlorophenol is extracted with aqueous caustic introduced by line 3 in an amount sufficient to convert all of the 2,3,6-trichlorophenol and a minor proportion of the 2,4,5-trichlorophenol to the water-soluble corresponding phenates.

Extract phenate solution is separated and removed by line 4. If desired, the phenates are acidified by means of a mineral acid in zone 5 and the phenols containing substantially all the 2,4,6-trichlorophenol and a few per cent of the 2,4,5-trichlorophenol of the original charge are removed by line 6.

The undissolved phenol residue from the aqueous phenate solution of extraction step 1 is separated and removed by line 7 to the second extraction step 8 and treated with aqueous caustic solution introduced by line 9 in an amount sufficient to convert less than the total quantity of the phenols contained in the residue to the corresponding phenates. The undissolved phenol residue after caustic treatment is removed by line 10.

The phenate extract solution is separated and removed by line 11. If desired, the phenate extract is steam distilled in zone 12 to improve the color of the 2,4,5-trichlorophenol. Steam distilled phenate extract is removed by line 13 and acidified by means of a mineral acid in zone 14 and 2,4,5-trichlorophenol is removed by line 15.

It is advantageous to use an aqueous caustic solution extracting agent containing not more than about 10% by weight of caustic since the employment of more concentrated caustic solutions results in dissolving a significant proportion of unneutralized phenols by the resulting aqueous phenate solution. Water should be added, therefore, to the aqueous extracting solution prior to or during each extraction, if required, to adjust the phenate concentration to not more than about 15% by weight to insure the separation of the unneutralized phenols as a separate phase which may be removed from contact with the aqueous phase.

The caustic used in the extraction process will ordinarily be sodium hydroxide but other alkali metal hydroxides, particularly potassium hydroxide, may also be used. The amount of caustic employed in the first extraction step preferably is sufficient to dissolve all of the 2,3,6-trichlorophenol and other extraneous phenols present and at least about 1 or 2% of the 2,4,5-trichlorophenol. The proportion of caustic used in the first extraction is thus dependent on the purity of the original crude 2,4,5-trichlorophenol. This in turn depends on the purity of the 1,2,4,5-tetrachlorobenzene employed to produce the crude 2,4,5-trichlorophenol. Less pure 2,4,5-trichlorophenol requires a greater amount of caustic in the first extraction step than when the crude trichlorophenol contains a smaller proportion of impurities. With very impure mixtures, the caustic may amount to sufficient to extract as much as one-third to one-half of the phenols present. The amount of caustic used to extract the residue from the first extraction step will range from about 25% to about 95% of that required to extract the phenols present as water-soluble phenates.

Steam distillation before acidification of the crude 2,4,5-trichlorophenate solution resulting from the hydrolysis is extremely beneficial in that it removes some of the caustic insoluble impurities which otherwise are concentrated in the residual materials, making phase separation after each extraction progressively more difficult. Steam distillation thus reduces the proportion of remaining crude trichlorophenol to be reworked or discarded and further permits taking a larger heart cut of the crude product by caustic extraction in the second step and the recovery of a larger proportion of 2,4,5-trichlorophenol of the desired degree of purity. Steam distillation of the 2,4,5-trichlorophenol obtained by acidification of the second extract and extraction is also advantageous in improving the color of the purified product.

While the extraction process of my invention is carried out at temperatures at which the trichlorophenol is liquid, the acidification of the extracts and recovery of phenols therefrom may be carried out at the same or lower temperatures. By acidifying the extracts at relatively low temperatures, the phenols may be precipitated as solids and removed by filtration. Alternatively, at elevated temperatures the trichlorophenol products may be obtained as liquids. The purity of the crude trichlorophenol and of the final products determines the limiting temperatures below which acidification of the extracts must be carried out in order to obtain the products as solids. However, all the operations are preferably carried out between about 20° and 80° C.

*Example*

A crude 2,4,5-trichlorophenol product (M. P. 60° to 62° C.) is obtained by acidifying the crude alkaline solution resulting from the caustic hydrolysis of 1,2,4,5-tetrachlorobenzene and contains about 97% of 2,4,5-trichlorophenol, 1% of 2,3,6-trichlorophenol and about 2% of trichloroanisole and other impurities. The crude phenol is then extracted at about 70° C. with an amount of 5% aqueous sodium hydroxide calculated to convert about 5% of the phenols present to the corresponding sodium phenates. The extract solution after separation from undissolved phenols yields an impure product containing upon acidification substantially all of the 2,3,6-trichlorophenol and a few per cent of the 2,4,5-trichlorophenol of the original charge.

The separated trichlorophenol residue from the first extraction is then treated at about 70° C. with an amount of 5% aqueous sodium hydroxide calculated to convert about 90% of the original charge, calculated as 2,4,5-trichlorophenol to sodium 2,4,5-trichlorophenate.

After agitating and separating at about 70° C., the undissolved portion is removed and is combined with the crude trichlorophenols obtained by acidifying the first extract. Steam distilling the second extract solution before acidification aids materially in removing undissolved materials and results in an improvement in color of the 2,4,5-trichlorophenol obtained by subsequent acidification of the extract. The second extract solution, with or without the steaming operation, is then acidified by the use of mineral acid, for example sulfuric or hydrochloric acid, at 60° C. The liquid 2,4,5-trichlorophenol formed is separated from the aqueous salt solution, steam distilled, dried, and crystallized. The crystallized product has a melting point in excess of 65° C., is water-white in color, and is in excess of 99% purity.

I claim:

A process for the recovery of 2,4,5-trichlorophenol from crude mixtures thereof obtained by caustic hydrolysis of 1,2,4,5-tetrachlorobenzene, which comprises extracting the crude 2,4,5-trichlorophenol at a temperature at which the mixture is in the liquid state with aqueous caustic solution in an amount calculated to convert the contaminating chlorophenols and a minor proportion of the 2,4,5-trichlorophenol present to the corresponding phenates, the resulting solution having a phenate concentration of not more than about 15 per cent by weight, separating the undissolved residue from the resulting aqueous phenate solution, extracting the separated residue at temperature at which the residue is liquid with aqueous caustic solution in an amount calculated to convert less than the total quantity of the phenols contained in the residue to the corresponding phenates, separating the resulting phenate extract solution from the remaining undissolved residue, and acidifying the extract solution to recover 2,4,5-trichlorophenol.

References Cited in the file of this patent

UNITED STATES PATENTS

| | | |
|---|---|---|
| 2,509,245 | Nikawitz et al. | May 30, 1950 |
| 2,615,923 | Henrich | Oct. 28, 1952 |